United States Patent

Balzer

(10) Patent No.: US 8,525,414 B2
(45) Date of Patent: Sep. 3, 2013

(54) METHOD AND DEVICE FOR CONTROLLING THE LIGHT FUNCTIONS OF HEADLIGHTS OF A VEHICLE

(75) Inventor: Dirk Balzer, Nierstein (DE)

(73) Assignee: GM Global Technology Operations LLC, Detroit, MI (US)

( * ) Notice: Subject to any disclaimer, the term of this patent is extended or adjusted under 35 U.S.C. 154(b) by 526 days.

(21) Appl. No.: 12/822,976

(22) Filed: Jun. 24, 2010

(65) Prior Publication Data

US 2011/0018442 A1   Jan. 27, 2011

(30) Foreign Application Priority Data

Jun. 26, 2009   (DE) .................. 10 2009 030 589

(51) Int. Cl.
*H05B 37/00* (2006.01)
(52) U.S. Cl.
USPC ............................... 315/77; 315/82; 315/307
(58) Field of Classification Search
USPC ............ 315/76, 77, 82, 83, 81, 80, 291, 307, 315/308; 362/37, 466, 464, 284
See application file for complete search history.

(56) References Cited

U.S. PATENT DOCUMENTS

| | | | |
|---|---|---|---|
| 5,821,700 A * | 10/1998 | Malvaso | 315/291 |
| 6,343,869 B1 | 2/2002 | Kobayashi | |
| 6,914,395 B2 * | 7/2005 | Yamauchi et al. | 315/308 |

FOREIGN PATENT DOCUMENTS

| | | |
|---|---|---|
| DE | 10 121 692 A1 | 11/2002 |
| DE | 102006022022 A1 | 9/2007 |
| DE | 102006021694 A1 | 11/2007 |
| EP | 1 593 936 A2 | 11/2005 |
| EP | 1977928 A1 | 10/2008 |

OTHER PUBLICATIONS

Great Britain Search Report for GB1008586.8 conducted Sep. 8, 2010.

* cited by examiner

*Primary Examiner* — David H Vu
(74) *Attorney, Agent, or Firm* — Ingrassia Fisher & Lorenz, P.C.

(57) ABSTRACT

A device is provided for controlling a light function of a headlight of a vehicle and a method is provided for controlling the light functions of headlights of a vehicle that includes, but is not limited to at least two different light functions are set by at least one drive device and the drive device is activated via a light control unit. The light control unit communicates with a supervision authority, parameters stored in the supervision authority predefining the dynamic behavior of the light functions.

19 Claims, 1 Drawing Sheet

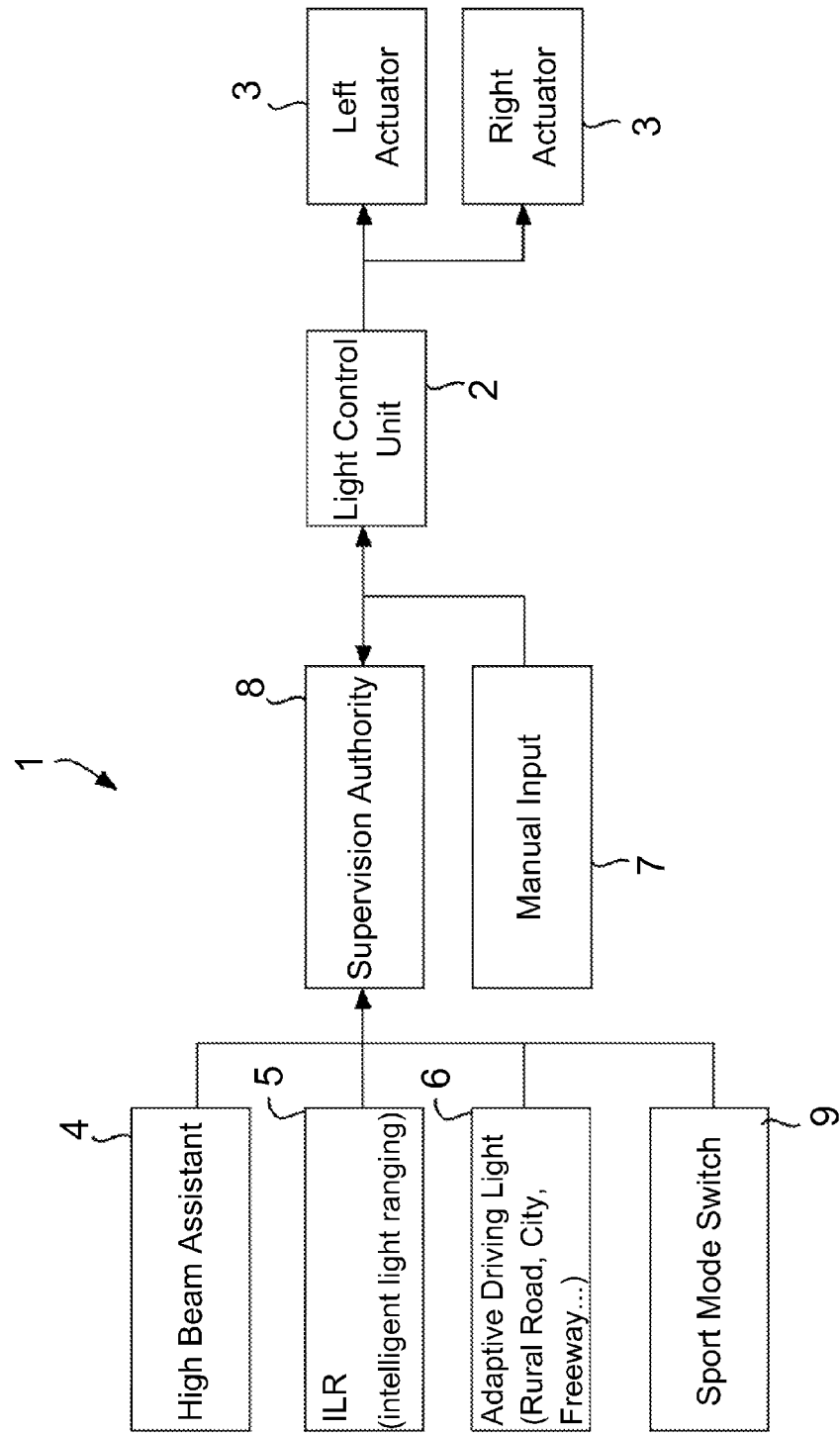

METHOD AND DEVICE FOR CONTROLLING THE LIGHT FUNCTIONS OF HEADLIGHTS OF A VEHICLE

CROSS-REFERENCE TO RELATED APPLICATION

This application claims priority to German Patent Application No. 102009030589.0, filed Jun. 26, 2009, which is incorporated herein by reference in its entirety.

TECHNICAL FIELD

The invention relates to a method for controlling the light functions of headlights of a vehicle. Furthermore, the invention relates to a device for controlling the light functions.

BACKGROUND

In particular, the front headlights of road vehicles are currently controlled using intelligent systems which allow the lighting or light function which offers the greatest comfort and the greatest safety to be selected for each driving situation. Thus, for example, one can switch back and forth between dimmed headlights and high beams. In addition, further light functions such as curve light, bad weather light, city light, rural road light, or freeway light may be implemented, which each differ in the light power, the range, and the width and symmetry of the light cone. A control unit selects the suitable light function on the basis of data such as the current driving speed, the steering angle, and/or GPS coordinates, and sets this function with the aid of a drive device (actuator) at the headlights. A method of this type and a device for controlling the light functions are known from DE 10 2006 022 022 A1.

A special requirement is to select and implement the suitable light function, on the one hand, but also to maintain high driving comfort and not to switch back-and-forth between the individual light functions excessively rapidly, on the other hand.

At least one object of the invention is therefore to specify a method for controlling the light functions of headlights of a vehicle, which is particularly user-friendly and is easy to handle in both the usage and also in the development and maintenance. Furthermore, a suitable device is to be specified for controlling the light functions. In addition, other objects, desirable features, and characteristics will become apparent from the subsequent summary and detailed description, and the appended claims, taken in conjunction with the accompanying drawings and this background.

SUMMARY

In the case of a method according to an embodiment of the invention for controlling the light functions of headlights of a vehicle, at least two different light functions are set by a drive device and a drive device is activated via a light control unit. The light control unit communicates with a supervision authority, parameters stored in the supervision authority predefining the dynamic behavior of the light functions.

Parameters that predefine the dynamic behavior of the light functions are understood here and hereafter as all parameters that characterize the change between various light functions or lighting patterns, in particular the maximum and/or the mean switching frequency, at which switching is performed back-and-forth between multiple functions, the transition time, i.e., a time duration for the transition between two light functions, and the shape of the ramp if the transition does not occur abruptly, but rather gradually.

This method has the advantage that in the newly provided, separate level of the supervision authority, the parameters predefining the dynamic behavior may be established globally for the entire system, while up to this point parameters of this type were defined individually for each light function. Through the introduction of the supervision authority, uniform dynamic behavior is achieved which provides great advantages in the development and maintenance. Specifically, it is possible using the method according to the invention to achieve a change or subsequent adaptation of the dynamic behavior through a simple modification of the supervision authority, which is implemented by a software module, for example.

The dynamic behavior can thus first be established and changed only at the very end of the development process or even after the vehicle is put into operation. It is thus possible to implement new legal requirements and also model-specific or user-specific requirements easily and without great technical effort.

In one embodiment, the supervision authority receives a request for a light function from an internal vehicle system or from a manual input of a user as the input signal. The supervision authority can also have the task of selecting the current light function to be applied and give it to the light control unit as the input signal. In this case, the supervision authority thus does not define, for example, a "softer" or "more aggressive" behavior through the global light strategy, but rather it also prioritizes the requests for light functions if several contradictory ones arrive at the same time. In particular a maximum switching frequency, a mean switching frequency, a transition time between two light functions, and/or a shape of the ramp for a transition between two light functions may be used as parameters stored in the supervision unit. In one embodiment, the supervision authority can be bypassed by a manual input of a user. The light functions are, for example, city light, bad weather light, freeway light, rural road light, curve light, and/or high beams.

According to a further embodiment of the invention, a device for controlling the light functions of headlights of a vehicle comprises a drive device for setting the light functions of the headlights, a light control unit for activating the drive device, and a supervision authority which communicates with the light control unit, the dynamic behavior of the light functions being predefinable via the parameters stored in the supervision authority. The dynamic behavior is defined jointly for all light functions in the supervision authority, i.e., the supervision authority contains all parameters needed for the definition of the dynamic behavior. In addition, the dynamic behavior for all light functions can even be defined uniformly in the supervision authority, i.e., the individual parameters, such as a transition time, are identical for all light functions. In this case, the dynamic behavior can be predefined and changed particularly simply.

The device according to an embodiment of the invention is particularly suitable for use on the front headlights of a vehicle. However, it can also be used for the rear headlights, for example.

BRIEF DESCRIPTION OF THE DRAWINGS

The present invention will hereinafter be described in conjunction with the following drawing FIGURE that schematically shows the functional construction of a device for controlling the light functions of headlights of a vehicle according to an embodiment of the invention.

DETAILED DESCRIPTION

The following detailed description is merely exemplary in nature and is not intended to limit application and uses. Furthermore, there is no intention to be bound by any theory presented in the preceding background or summary or the following detailed description.

The device 1 comprises a light control unit 2 that activates actuators or drive devices 3 of the right and left front headlights. As input signals, the light control unit 2 receives requests of internal vehicle systems, for example, from a high beam assistant 4, which controls the change between dimmed headlights and high beams as a function of whether vehicles driving ahead or oncoming vehicles are present, from an ILR (intelligent light ranging) system 5, and/or the adaptive driving light 6, to select the suitable lighting scenarios for the current driving situation. In addition, manual inputs 7 of a driver are possible as the input signal for the light control unit 2. The manual input 7 can also be processed by the supervision authority 8.

At least the requests of the internal vehicle systems 4, 5, and 6 first reach a supervision authority 8, however, which prioritizes the requests and determines the dynamic behavior of the light functions on the basis of predefined parameters. If calm, less nervous behavior is desired, for example, the supervision authority can limit the maximum switching frequency to a low value and additionally ensure soft transitions between individual light functions. However, manual inputs 7 of the driver have priority in the exemplary embodiment shown and may bypass the supervision authority 8.

The supervision authority 8 is implemented as a software module, in which the parameters determining the dynamic behavior of the light function are globally stored. These parameters are accordingly no longer directly associated with the individual internal vehicle systems 4, 5, and 6. They may therefore be established or changed later by a single intervention in the supervision authority 8, which is easy to implement.

The sport mode switch 9 is shown in the FIGURE as part of the device 1. For example, the damping of the vehicle is set with the aid of the sport mode switch 9. If the sport mode is turned on, the damping is harder than if the sport mode is turned off. However, the sport mode switch 9 also has the function of setting the supervision authority. If the supervision authority is turned on, the change of the lighting occurs more rapidly. In sport mode, it is expected that the vehicle is driven in a sportier manner, so that the lighting is also to be set as rapidly as possible to new conditions.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for controlling a light function of a headlight of a vehicle, comprising the steps of:

communicating a parameter to a light control unit from a supervision authority that stores a predefine dynamic behavior of the light function;

setting at least two different light functions with a drive device at least based partly upon the parameter; and activating the drive device via the light control unit.

2. The method according to claim 1, further comprising the step of receiving a request for the light function by the supervision authority from an internal vehicle system as an input signal.

3. The method according to claim 1, further comprising the step of receiving a request for the light function by the supervision authority from a manual input of a user as an input signal.

4. The method according to claim 1, further comprising the step of using a maximum switching frequency as the parameter stored in the supervision authority.

5. The method according to claim 1, further comprising the step of using a mean switching frequency as the parameter stored in the supervision authority.

6. The method according to claim 1, further comprising the step of using a transition time between the at least two different light functions as the parameter stored in the supervision authority.

7. The method according to claim 1, further comprising the step of using a shape of a ramp for a transition between the at least two different light functions as the parameter stored in the supervision authority.

8. The method according to claim 1, further comprising the steps:

selecting a current light function to be applied by the supervision authority; and providing the current light function to the light control unit as an input signal.

9. The method according to claim 1, further comprising the step of bypassing the supervision authority by a manual input of a user.

10. The method according to claim 1, wherein at least one of the at least two different light functions is a city light.

11. The method according to claim 1, wherein at least one of the at least two different light functions is a bad weather light.

12. The method according to claim 1, wherein at least one of the at least two different light functions is freeway light.

13. The method according to claim 1, wherein at least one of the at least two different light functions is a rural road light.

14. The method according to claim 1, wherein the at least one of the at least two different light functions is a curve light.

15. The method according to claim 1, wherein the at least one of the at least two different light functions is a high beam light.

16. A device for controlling a light function of a headlight of a vehicle, comprising:

a drive device adapted to set the light function of the headlight;

a light control unit adapted to activate the drive device; and a supervision authority adapted to communicate with the light control unit, the communication between the supervision authority and the light control unit comprising a dynamic behavior of the light function that is predefinable via a parameter stored in the supervision authority.

17. The device according to claim 16, wherein the supervision authority is implemented by a software module.

18. The device according to claim 16, wherein the dynamic behavior for the light function is defined jointly in the supervision authority.

19. The device according to claim 18, wherein the dynamic behavior for the light function is defined uniformly in the supervision authority.

\* \* \* \* \*